US012639303B2

(12) United States Patent
Frantz et al.

(10) Patent No.: US 12,639,303 B2
(45) Date of Patent: May 26, 2026

(54) EVALUATING STORED QUERY RESULTS

(71) Applicant: SIGMA COMPUTING, INC., San Francisco, CA (US)

(72) Inventors: Jason D. Frantz, San Francisco, CA (US); Dmitri Bronnikov, Foster City, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 151 days.

(21) Appl. No.: 17/529,914

(22) Filed: Nov. 18, 2021

(65) Prior Publication Data

US 2023/0153301 A1 May 18, 2023

(51) Int. Cl.
*G06F 16/2453* (2019.01)
*G06F 16/242* (2019.01)
*G06F 16/25* (2019.01)

(52) U.S. Cl.
CPC .... *G06F 16/24539* (2019.01); *G06F 16/2423* (2019.01); *G06F 16/2425* (2019.01); *G06F 16/256* (2019.01)

(58) Field of Classification Search
CPC ........... G06F 16/24539; G06F 16/2425; G06F 16/256; G06F 16/2423
See application file for complete search history.

(56) References Cited

U.S. PATENT DOCUMENTS

| | | | | |
|---|---|---|---|---|
| 7,716,236 | B2 * | 5/2010 | Sidhu .................. | G06F 16/9535 |
| | | | | 707/766 |
| 11,068,520 | B1 * | 7/2021 | Neumann ........... | G06F 16/3332 |
| 11,200,740 | B1 * | 12/2021 | Samuel ................ | G06F 3/0485 |
| 11,269,824 | B1 * | 3/2022 | Waas ................. | G06F 16/2448 |
| 11,748,458 | B2 * | 9/2023 | Sarkar ...................... | G06F 8/75 |
| | | | | 713/189 |
| 2008/0021721 | A1 * | 1/2008 | Jones ................. | G06Q 50/2057 |
| | | | | 434/350 |
| 2008/0167886 | A1 * | 7/2008 | Marcken ................ | G06Q 10/10 |
| | | | | 705/5 |
| 2010/0325134 | A1 * | 12/2010 | Galfond ................ | G06F 16/951 |
| | | | | 707/769 |
| 2010/0332513 | A1 * | 12/2010 | Azar .................. | G06F 16/24545 |
| | | | | 707/753 |
| 2011/0270861 | A1 * | 11/2011 | Arshavsky .......... | G06F 16/9024 |
| | | | | 707/769 |
| 2014/0279435 | A1 * | 9/2014 | Holman ............... | G06Q 20/405 |
| | | | | 705/39 |

(Continued)

FOREIGN PATENT DOCUMENTS

CN 104063486 A * 7/2014 ......... G06F 16/2255

*Primary Examiner* — Vaishali Shah

(57) ABSTRACT

Evaluating stored query results including generating a database query using a state specification of a graphical user interface, wherein the database query is composed to retrieve a current query result from a cloud-based data warehouse; searching a cache local to the query execution engine for the current query result, wherein the cache comprises a first previous query result from the cloud-based data warehouse; determining, based on the searching, that the current query result may be generated using the first previous query result from the cache; and creating the current query result using at least a portion of the first previous query result from the cache.

20 Claims, 8 Drawing Sheets

(56)        References Cited

U.S. PATENT DOCUMENTS

| | | | |
|---|---|---|---|
| 2015/0277802 A1* | 10/2015 | Oikarinen | G06F 3/0689 |
| | | | 711/114 |
| 2016/0315910 A1* | 10/2016 | Kaufman | H04L 61/4511 |
| 2017/0039251 A1* | 2/2017 | Legrand | G06F 16/27 |
| 2017/0060903 A1* | 3/2017 | Botea | G06Q 50/14 |
| 2017/0289187 A1* | 10/2017 | Noel | G06F 16/9024 |
| 2019/0004837 A1* | 1/2019 | Tiwary | H04L 67/10 |
| 2019/0104084 A1* | 4/2019 | Tiwary | H04L 67/1008 |
| 2019/0196890 A1* | 6/2019 | Bucchi | G06F 16/951 |
| 2020/0125566 A1* | 4/2020 | Scott | G06F 16/24535 |
| 2020/0286011 A1* | 9/2020 | Meng | G06F 16/242 |
| 2022/0121708 A1* | 4/2022 | Burnett | G06F 16/9017 |
| 2022/0171873 A1* | 6/2022 | Lundbæk | G06F 16/9538 |
| 2022/0229840 A1* | 7/2022 | Mouleeswaran | |
| | | | G06F 16/24537 |

* cited by examiner

EVALUATING STORED QUERY RESULTS

BACKGROUND

Field of the Invention

The field of the invention is data processing, or, more specifically, methods, apparatus, and products for evaluating stored query results.

Description of Related Art

Modern businesses may store large amounts of data in remote databases within cloud-based data warehouses. This data may be accessed using database query languages, such as structured query language (SQL). Manipulating the data stored in the database may require constructing complex queries beyond the abilities of most users. Further, composing and issuing database queries efficiently may also be beyond the abilities of most users.

SUMMARY

Methods, systems, and apparatus for evaluating stored query results. Evaluating stored query results includes generating, by a query execution engine, a database query using a state specification of a graphical user interface, wherein the database query is composed to retrieve a current query result from a cloud-based data warehouse; searching, by the query execution engine, a cache local to the query execution engine for the current query result, wherein the cache comprises a first previous query result from the cloud-based data warehouse; determining, by the query execution engine based on the searching, that the current query result may be generated using the first previous query result from the cache; and creating, by the query execution engine, the current query result using at least a portion of the first previous query result from the cache.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
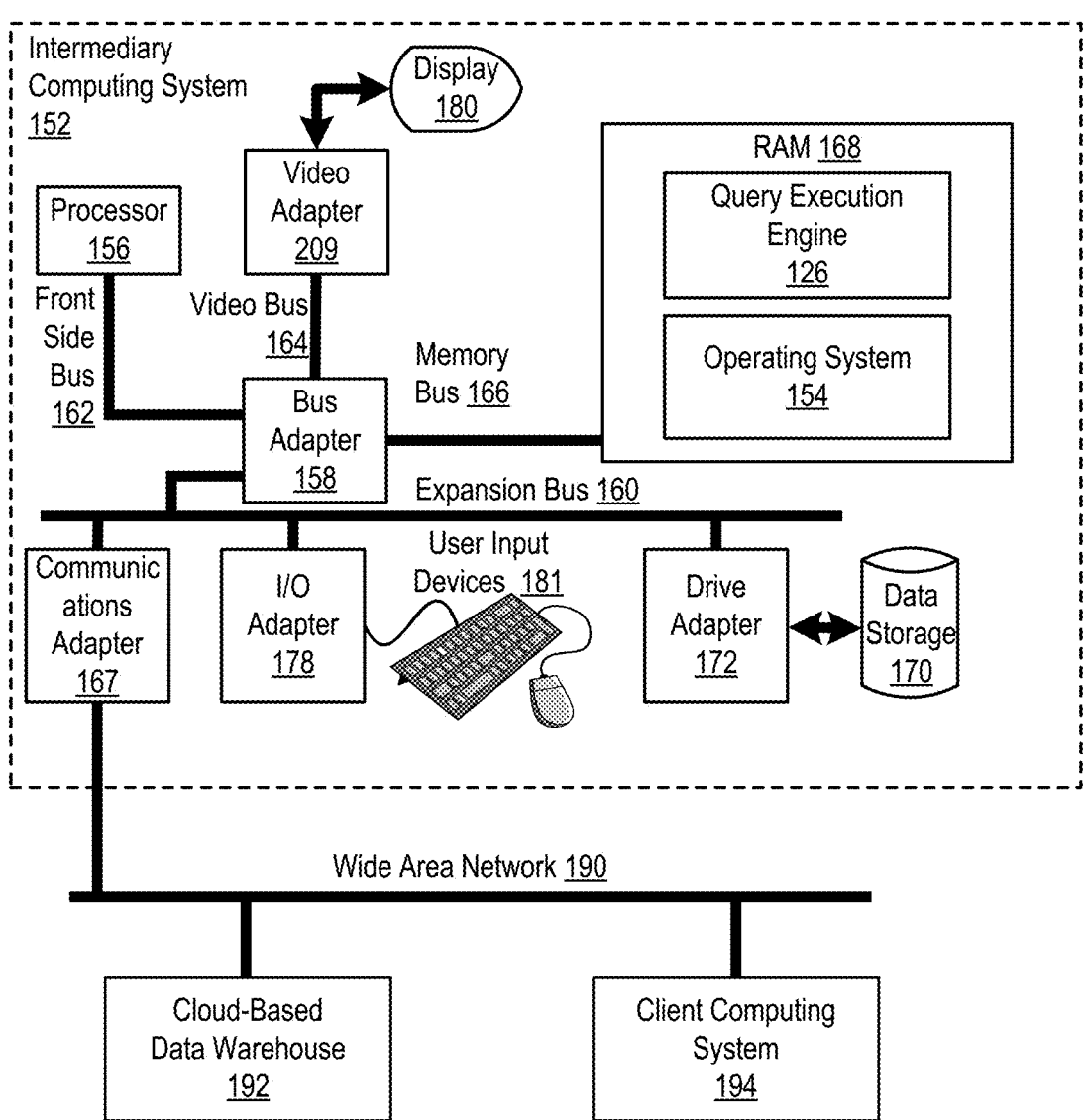
FIG. 1 sets forth a block diagram of an example system configured for evaluating stored query results according to embodiments of the present invention.

Exemplary methods, apparatus, and products for evaluating stored query results in accordance with the present invention are described with reference to the accompanying drawings, beginning with FIG. 1. FIG. 1 sets forth a block diagram of automated computing machinery comprising an exemplary intermediary computing system 152 configured for evaluating stored query results according to embodiments of the present invention. The intermediary computing system 152 of FIG. 1 includes at least one computer processor 156 or 'CPU' as well as random access memory 168 ('RAM') which is connected through a high speed memory bus 166 and bus adapter 158 to processor 156 and to other components of the intermediary computing system 152.

Stored in RAM 168 is an operating system 154. Operating systems useful in computers configured for evaluating stored query results according to embodiments of the present invention include UNIX™, Linux™, Microsoft Windows™, AIX™, and others as will occur to those of skill in the art. The operating system 154 in the example of FIG. 1 is shown in RAM 168, but many components of such software typically are stored in non-volatile memory also, such as, for example, on data storage 170, such as a disk drive. Also stored in RAM is the query execution engine 126, a module for evaluating stored query results according to embodiments of the present invention.

The intermediary computing system 152 of FIG. 1 includes disk drive adapter 172 coupled through expansion bus 160 and bus adapter 158 to processor 156 and other components of the intermediary computing system 152. Disk drive adapter 172 connects non-volatile data storage to the intermediary computing system 152 in the form of data storage 170. Disk drive adapters useful in computers configured for evaluating stored query results according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example intermediary computing system 152 of FIG. 1 includes one or more input/output ('I/O') adapters 178. I/O adapters implement user-oriented input/output through, for example, software drivers and computer hardware for controlling output to display devices such as computer display screens, as well as user input from user input devices 181 such as keyboards and mice. The example intermediary computing system 152 of FIG. 1 includes a video adapter 209, which is an example of an I/O adapter specially designed for graphic output to a display device 180 such as a display screen or computer monitor. Video adapter 209 is connected to processor 156 through a high speed video bus 164, bus adapter 158, and the front side bus 162, which is also a high speed bus.

The exemplary intermediary computing system 152 of FIG. 1 includes a communications adapter 167 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for evaluating stored query results according to embodiments of the present invention include modems for wired dial-up communications, Ethernet (IEEE 802.3) adapters for wired data communications, and 802.11 adapters for wireless data communications.

The communications adapter 167 is communicatively coupled to a wide area network 190 that also includes a cloud-based data warehouse 192 and a client computing system 194. The cloud-based data warehouse 192 is a computing system or group of computing systems that hosts a database or databases for access over the wide area network 190. The client computing system 194 is a computing system that accesses the database using the query execution engine 126. Although FIG. 1 depicts the query execution engine 126 within the intermediary computing system 152, the query execution engine may alternatively be executed within the client computing system 194.

Figure 2:
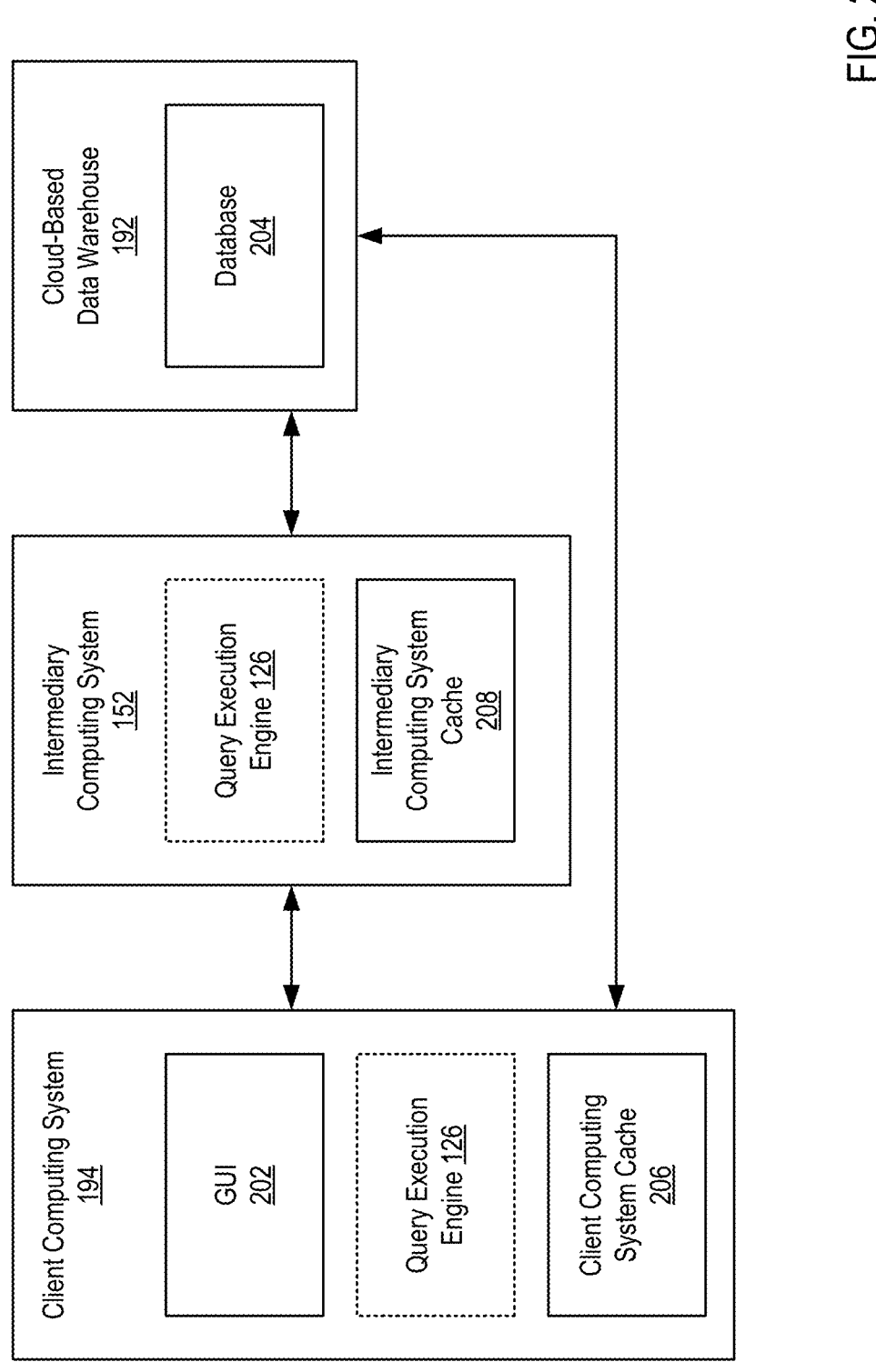
FIG. 2 sets forth a block diagram of an example system configured for evaluating stored query results according to embodiments of the present invention.

FIG. 2 shows an exemplary system for evaluating stored query results according to embodiments of the present invention. As shown in FIG. 2, the system includes a client computing system 194, an intermediary computing system 152, and a cloud-based data warehouse 192. The client computing system 194 includes a graphical user interface (GUI) 202 and a client computing system cache 206. The intermediary computing system 152 includes an intermediary computing system cache 208. The cloud-based data warehouse 192 includes a database 204. The query execution engine 126 may reside on either the client computing system 194 and/or the intermediary computing system 152 and utilize the associated computing system cache (client computing system cache 206, intermediary computing system cache 208). The cache may be a browser cache associated with an Internet browser. The client computing system 194 may access the cloud-based data warehouse 192 and database 204 directly or may access the cloud-based data warehouse 192 and database 204 via the intermediary computing system 152.

The GUI 202 is a visual presentation configured to present data sets in the form of worksheets and graphical elements to a user. The GUI 202 also receives requests from a user for data sets from the database 204. The GUI 202 may be presented, in part, by the query execution engine 126 and displayed on a client computing system 194 (e.g., on a system display or mobile touchscreen). The GUI 202 may be part of an Internet application that includes the query execution engine 126 and is hosted on the intermediary computing system 152. Alternatively, the GUI 202 may be part of an Internet application that includes the query execution engine 126 and is hosted on the client computing system 194.

The database 204 is a collection of data and a management system for the data. A data set is a collection of data (such as a table) from the database 204. Data sets may be organized into columns and rows (also referred to as records). The particular columns, rows, and organization of the columns and rows that make up a data set may be specified in the database statement requesting the data set. A data set, as sent from the database to the intermediary computing system 152 and client computing system 194, may be a portion or subset of a source database table on the database. Data sets may be sent from the cloud-based data warehouse 192 in response to a database query. Accordingly, data sets retrieved in response to a database query may be referred to as query results.

The query execution engine 126 is hardware, software, or an aggregation of hardware and software configured to receive a state specification from the client computing system 194, via the GUI 202. The query execution engine 126 is also configured to generate database queries in response to manipulations of the GUI 202 described in the state specification.

The state specification is a collection of data describing inputs into the GUI 202. The state specification may include manipulations of GUI elements within the GUI 202 along with data entered into the GUI 202 by a user of the client computing system 194. Such manipulations and data may indicate requests for and manipulations of data sets. The state specification may be a standard file format used to exchange data in asynchronous browser-server communication. For example, the state specification may be a JavaScript Object Notation specification. The state specification may include descriptions of elements that are used to apply changes to the data set. Such elements may include filters applied to the worksheet, the hierarchical level of the worksheet, joins performed within the worksheet, exposable parameters in the worksheet, and security for the worksheet.

The query execution engine 126 uses the state specification as input to generate a database query. This transformation process may begin with state specification being converted into an abstract syntax tree. The abstract syntax tree may then be canonicalized into a canonicalized hierarchy. The canonicalized hierarchy may then be linearized into the worksheet algebra. The worksheet algebra may then be lowered into a relational algebra, which may then be lowered into the database query.

The query execution engine 126 may use the database query to fetch query results (i.e., a data set) from the database 204. The query execution engine 126 may then present the query results to a user via the GUI 202. The query execution engine 126 may also store the query results in a cache (client computing system cache 206, intermediary computing system cache 208) for later retrieval if the same or similar query is generated from a state specification.

Figure 3:
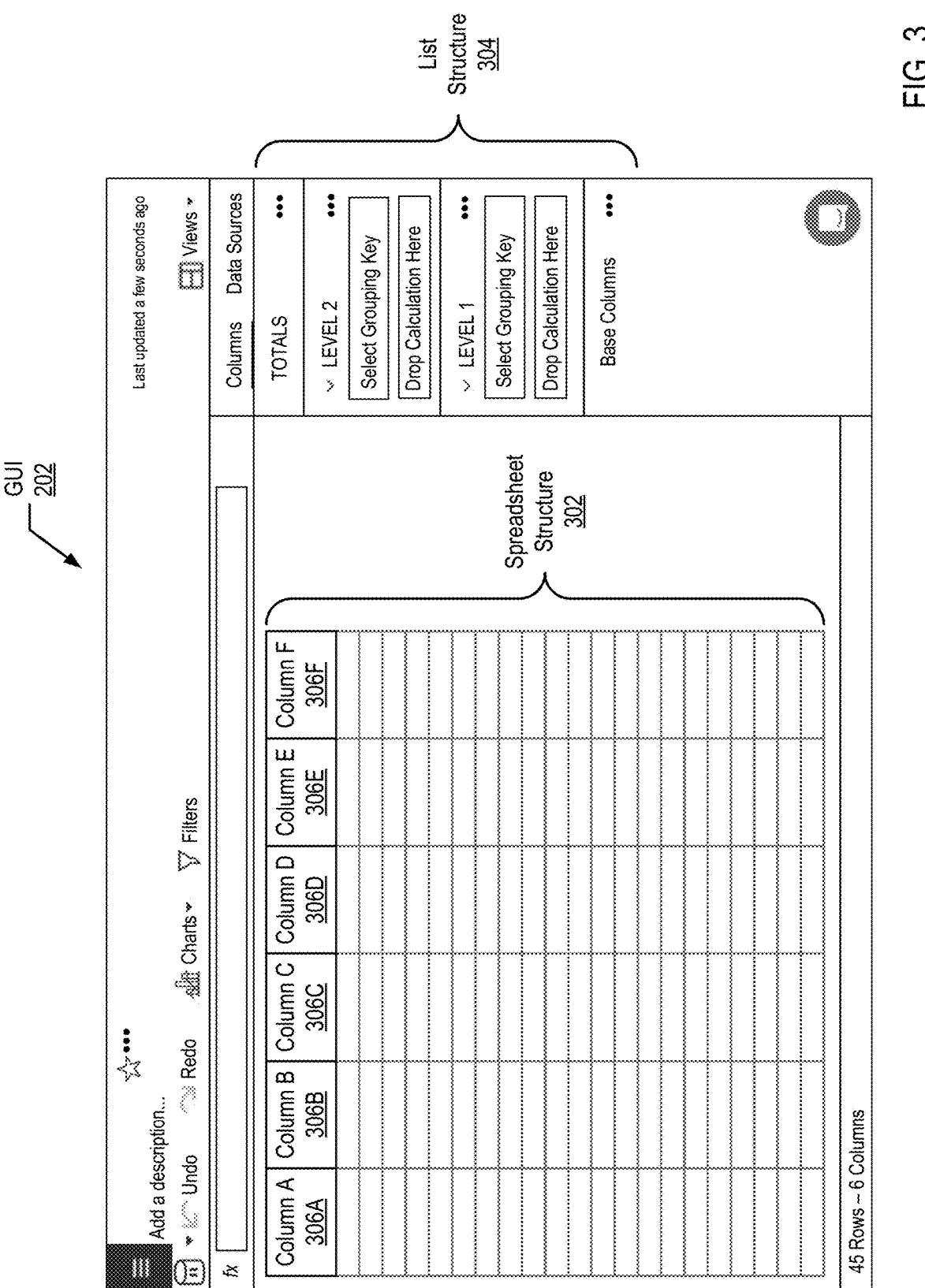
FIG. 3 sets forth a block diagram of an example system configured for evaluating stored query results according to embodiments of the present invention.

FIG. 3 shows an exemplary system for evaluating stored query results according to embodiments of the present invention. As shown in FIG. 3, the exemplary GUI 202 includes a spreadsheet structure 302 and a list structure 304. The spreadsheet structure 302 includes a worksheet (shown as empty rows) with six columns (column A 306A, column B 306B, column C 306C, column D 306D, column E 306E, column F 306F).

The spreadsheet structure 302 is a graphical element and organizing mechanism for a worksheet that presents a data set. A worksheet is a presentation of a data set (such as a table) from a database on a data warehouse. The spreadsheet structure 302 displays the worksheet as rows of data organized by columns (column A 306A, column B 306B, column C 306C, column D 306D, column E 306E, column F 306F). The columns delineate different categories of the data in each row of the worksheet. The columns may also be calculation columns that include calculation results using other columns in the worksheet.

The list structure 304 is a graphical element used to define and organize the hierarchical relationships between the columns (column A 306A, column B 306B, column C 306C, column D 306D, column E 306E, column F 306F) of the data set. The term "hierarchical relationship" refers to sub-ordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure 304 presents a dimensional hierarchy to the user. Specifically, the list structure 304 presents levels arranged hierarchically across at least one dimension. Each level within the list structure 304 is a position within a hierarchical relationship between columns (column A 306A, column B 306B, column C 306C, column D 306D, column E 306E, column F 306F). The keys within the list structure 304 identify the one or more columns that are the participants in the hierarchical relationship. Each level may have more than one key.

One of the levels in the list structure 304 may be a base level. Columns selected for the base level provide data at the finest granularity. One of the levels in the list structure 304 may be a totals or root level. Columns selected for the totals level provide data at the highest granular level. For example, the totals level may include a field that calculates the sum of each row within a single column of the entire data set (i.e., not partitioned by any other column).

The GUI 202 may enable a user to drag and drop columns (column A 306A, column B 306B, column C 306C, column D 306D, column E 306E, column F 306F) into the list structure 304. The order of the list structure 304 may specify the hierarchy of the columns relative to one another. A user may be able to drag and drop the columns in the list structure 304 at any time to redefine the hierarchical relationship between columns. The hierarchical relationship defined using the columns selected as keys in the list structure 304 may be utilized in charts such that drilling down (e.g., double click on a bar), enables a new chart to be generated based on a level lower in the hierarchy.

The GUI 202 may also include a mechanism for a user to request a table from a database to be presented as a worksheet in the GUI 202. Such a mechanism may be part of the interactivity of the worksheet. Specifically, a user may manipulate a worksheet (e.g., by dragging and dropping columns or rows, resorting columns or rows, etc.) and, in response, the GUI 202 may generate a request (e.g., in the form of a state specification) for a data set and send the request to the query execution engine 126. Such a mechanism may also include a direct identification of the rows and columns of a database table that a user would like to access (e.g., via a selection of the rows and columns in a dialog box).

Figure 4:
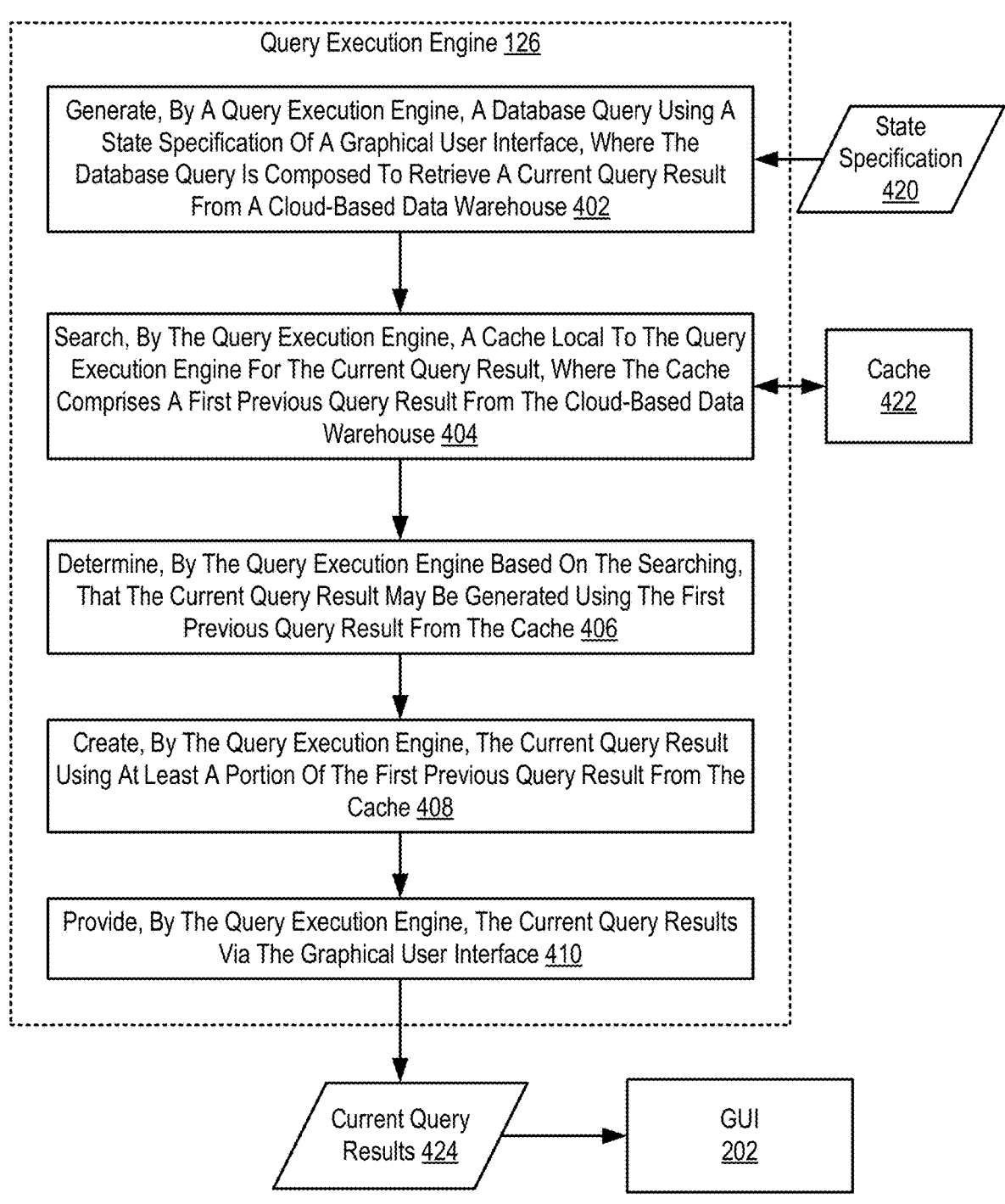
FIG. 4 sets forth a flow chart illustrating an exemplary method for evaluating stored query results according to embodiments of the present invention.

For further explanation, FIG. 4 sets forth a flow chart illustrating an exemplary method for evaluating stored query results according to embodiments of the present invention. As discussed above, the query execution engine 126 may reside with the GUI on a client computing system or separate from the GUI on the intermediary computing system between the client computing system and the cloud-based data warehouse 192. Alternatively, portions of the query execution engine 126 may be distributed between the client computing system and the intermediary computing system.

The method of FIG. 4 includes generating 402, by a query execution engine 126, a database query using a state specification 420 of a graphical user interface, wherein the database query is composed to retrieve a current query result from a cloud-based data warehouse. Generating 402 a database query using a state specification 420 may be carried out by detecting that a user has manipulated elements of the GUI 202 and/or submitted data using the GUI 202 such that the generation of a state specification 420 is triggered, and the state specification 420 is sent to the query execution engine 126. For example, a user may select a table from a group of tables presented for display in a worksheet on the GUI 202. As another example, a user may change the order of columns in the dimensional hierarchy of the GUI 202. Each change to the GUI 202 may result in a new or updated state specification 420.

The state specification 420 may then be translated into the database query. Specifically, the state specification is converted or lowered into various intermediate forms, including an abstract syntax tree, a canonicalized hierarchy, a worksheet algebra, and a relational algebra. During each of these intermediate forms, the query execution engine 126 may optimize the database query to efficiently retrieve the initial results from the database. The resulting database query may be a structured query language statement (SQL).

The method of FIG. 4 further includes searching 404, by the query execution engine 126, a cache 422 local to the query execution engine for the current query result, wherein the cache 422 comprises a first previous query result from the cloud-based data warehouse. The first previous query result may be a previously retrieved data set from a database. Searching 404 the cache 422 local to the query execution engine for the current query result may be carried out by using the generated database query as a key into the cache (client computing system cache, intermediary computing system cache). The cache (client computing system cache, intermediary computing system cache) may be indexed using database queries keyed to query results. As query results are received from the cloud-based data warehouse (e.g., for queries whose results are not currently stored in the cache), those query results are stored in the cache (client computing system cache, intermediary computing system cache) local (i.e., on the same system) to the query execution engine 126. The database query for each query result may be also stored and mapped to the associated query result.

As each database query is generated, the cache may be searched in an attempt to service the database query using previously retrieved results. If a previously retrieved data set includes the results of the current database query, then fetching the results from the cloud-based data warehouse 192 may be avoided.

The cache 422 may also include a second previous query result from the cloud-based data warehouse. The second previous query result may also be a previously retrieved data set from the database. The first previous query result and the second previous query may each be partial matches to the current query result.

The method of FIG. 4 further includes determining 406, by the query execution engine 126 based on the searching, that the current query result may be generated using the first previous query result from the cache 422. Determining 406 that the current query result may be generated using the first previous query result from the cache 422 may be carried out by receiving at least one match during the cache search using the generated database query. The matches may be evaluated to determine whether any of the matches are sufficient to create the complete current query result.

Determining 406 that the current query result may be generated using the first previous query result from the cache 422 may be based on an evaluation of dependency graphs for the current query result and the first previous query result. Specifically, a dependency graph for the current query result and the first previous query result may be generated. The dependency graphs for the first previous query result may be compared with the dependency graph for current query result. This may be accomplished by iterating through each node of the dependency graph to determine whether the current query result may be generated from the first previous query result.

The method of FIG. 4 further includes creating 408, by the query execution engine 126, the current query result using at least a portion of the first previous query result from the cache 422. Creating 408 the current query result using at least a portion of the first previous query result from the cache 422 may be carried out by retrieving the portion of the previous query result necessary for creating the current query result. The first previous query result may operate similar to the database in that the current query result may be extracted from the first previous query. Creating 408 the current query result is performed without accessing the cloud-based data warehouse hosting the database.

Determining 406 that the current query result may be generated using the first previous query result from the cache 422 may also be carried out by receiving partial matches during the cache search using the generated database query. The partial matches may be evaluated to determine whether any combination of partial matches is sufficient to create the complete current query result. For example, a combination of the first previous query result and a second previous query results may be sufficient to create the complete current query result. The combination of the first previous query result and the second previous query result may operate similar to the database in that the current query result may be extracted from the combination. This determination may also incorporate the use of dependency graphs for each previous query result.

The method of FIG. 4 further includes providing 410, by the query execution engine 126, the current query result via the graphical user interface 202. Providing 410, by the query execution engine 126, the current query result via the graphical user interface may be carried out by organizing the current query result into the spreadsheet structure of the GUI on the client computing system. If the query execution engine 126 is executing within the client computing system, then the results are presented locally through the GUI. If the query execution engine 126 is executing within the intermediary computing system, then the results are transmitted to the client computing system before presentation through the GUI.

As an example of the above, assume that the query execution engine generates a database query to retrieve current query result "BCD". The query execution engine may first determine whether "BCD" has been previously stored in the cache after a previously issued database query. The query execution engine may determine that the first previous query result "ABCD" is sufficient to generate the current query result "BCD". The query execution engine may then extract "BCD" from the first previous query result to create the current query result "BCD". The current query result "BCD" may then be presented via the GUI in the spreadsheet structure.

As an additional example of the above, assume that the query execution engine generates a database query to retrieve current query result "BCD". The query execution engine may first determine whether "BCD" has been previously stored in the cache after a previously issued database query. If the current query result does not exist in the cache in a single previous query, the query execution engine may then determine whether "BCD" may be created using any combination of previous query results. The cache may include a first previous query result "AB" and a second previous query result "CDE". The query execution engine may determine that the first previous query result "AB" and the second previous query result "CDE" are sufficient to generate the current query result "BCD". The query execution engine may then extract "BC" from the first previous query result and "D" from the second previous query result to create the current query result "BCD". The current query result "BCD" may then be presented via the GUI in the spreadsheet structure.

The above limitations improve the operation of the computer system by retrieving result data sets from a local cache rather than remotely from the cloud-based data warehouse, thus reducing time required to service the query and accesses to the could-base data warehouse.

Figure 5:
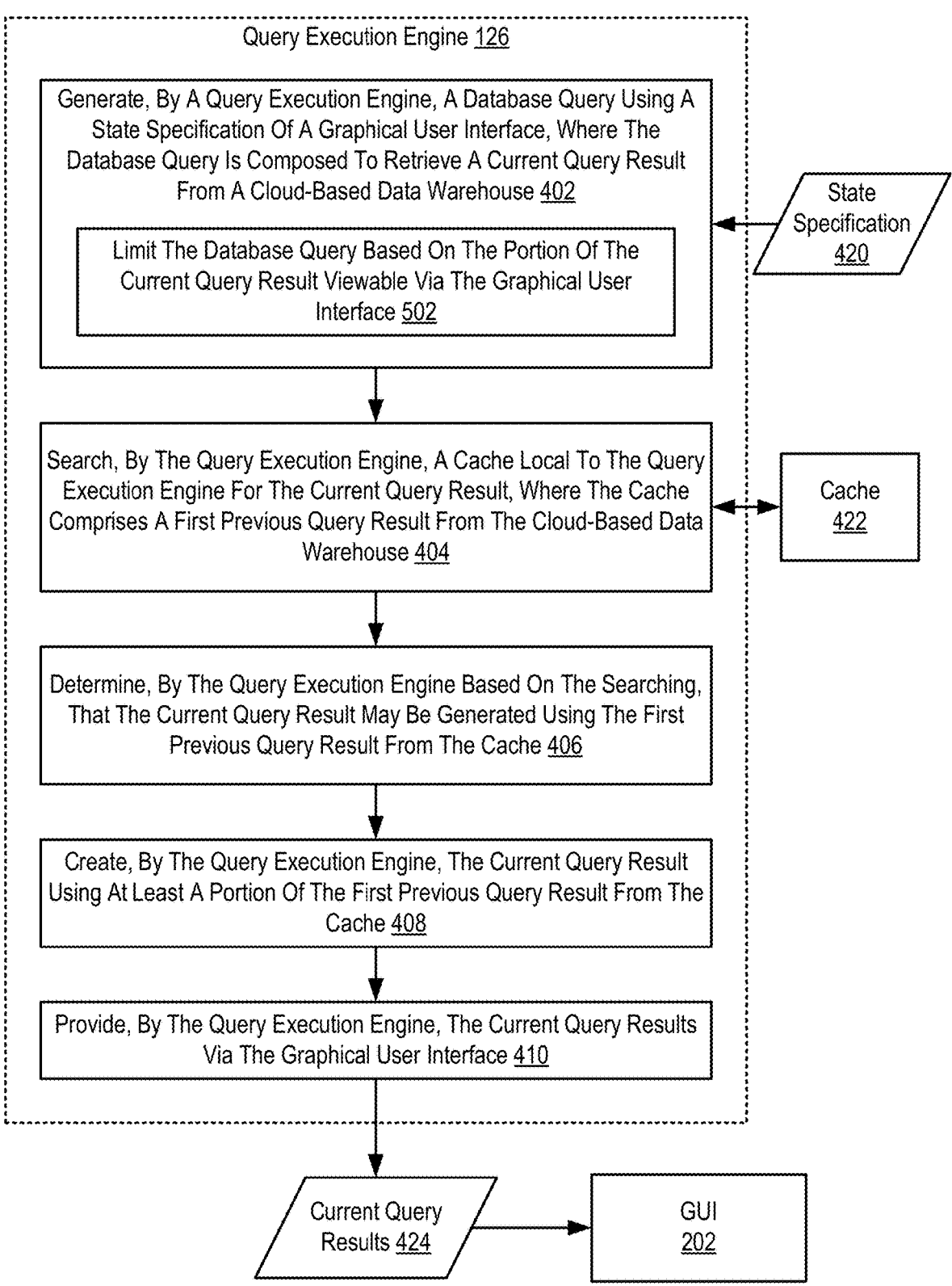
FIG. 5 sets forth a flow chart illustrating an exemplary method for evaluating stored query results according to embodiments of the present invention.

For further explanation, FIG. 5 sets forth a flow chart illustrating a further exemplary method for evaluating stored query results according to embodiments of the present invention that includes generating 402, by a query execution engine 126, a database query using a state specification 420 of a graphical user interface, wherein the database query is composed to retrieve a current query result from a cloud-based data warehouse; searching 404, by the query execution engine 126, a cache 422 local to the query execution engine for the current query result, wherein the cache 422 comprises a first previous query result from the cloud-based data warehouse; determining 406, by the query execution engine 126 based on the searching, that the current query result may be generated using the first previous query result from the cache 422; creating 408, by the query execution engine 126, the current query result using at least a portion of the first previous query result from the cache 422; and providing 410, by the query execution engine 126, the current query result via the graphical user interface 202.

The method of FIG. 5 differs from the method of FIG. 4, however, in that generating 402, by a query execution engine 126, a database query using a state specification 420 of a graphical user interface includes limiting 502 the database query based on the portion of the current query result viewable via the graphical user interface. Limiting 502 the database query based on the portion of the current query result viewable via the graphical user interface may be carried out by determining the portion of the current query result currently viewable in the GUI. Once the viewable portion has been determined, then the current query result may be modified to exclude the results not currently viewable in the GUI.

For example, if the state specification indicates that rows 1-1000 of Table A have been requested, but only rows 1-40 are currently viewable in the GUI, the database query may be modified to add a limit of rows 1-40. The resulting database query may therefore request rows 1-40 of Table A. Consequently, if a previous query result in the cache includes rows 1-40 of Table A, but not all of rows 41-1000 of Table A, then that previous query may be used to service the limited database query. If the GUI is manipulated such that additional rows are viewable, then a subsequent database query may be generated.

Figure 6:
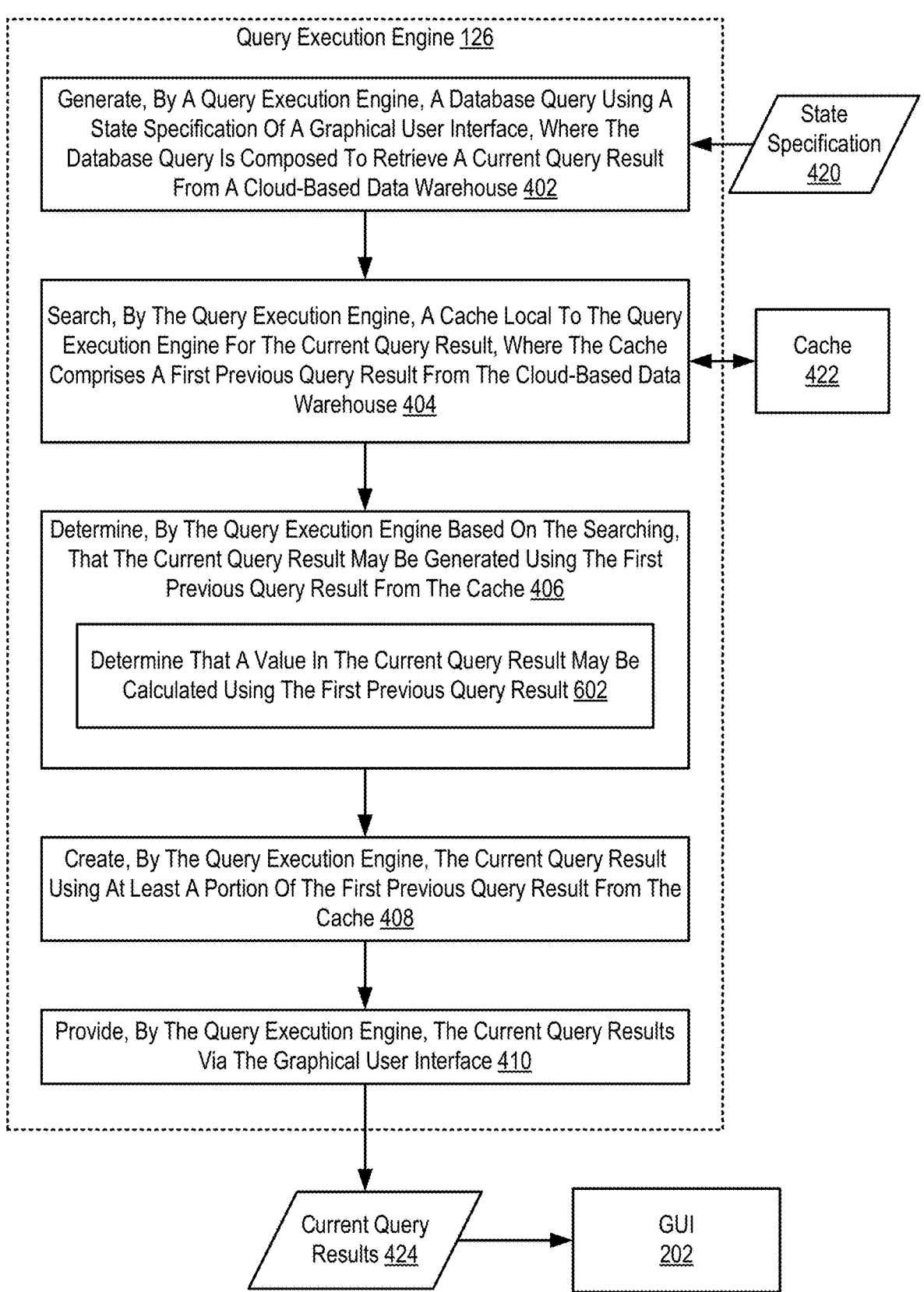
FIG. 6 sets forth a flow chart illustrating an exemplary method for evaluating stored query results according to embodiments of the present invention.

For further explanation, FIG. 6 sets forth a flow chart illustrating a further exemplary method for evaluating stored query results according to embodiments of the present invention that includes generating 402, by a query execution engine 126, a database query using a state specification 420 of a graphical user interface, wherein the database query is composed to retrieve a current query result from a cloud-based data warehouse; searching 404, by the query execution engine 126, a cache 422 local to the query execution engine for the current query result, wherein the cache 422 comprises a first previous query result from the cloud-based data warehouse; determining 406, by the query execution engine 126 based on the searching, that the current query result may be generated using the first previous query result from the cache 422; creating 408, by the query execution engine 126, the current query result using at least a portion of the first previous query result from the cache 422; and providing 410, by the query execution engine 126, the current query result via the graphical user interface 202.

The method of FIG. 6 differs from the method of FIG. 4, however, in that determining 406, by the query execution engine 126 based on the searching, that the current query result may be generated using the first previous query result from the cache 422 includes determining 602 that a value in the current query result may be calculated using the first previous query result. Determining 602 that a value in the current query result may be calculated using the first previous query result may be carried out by evaluating the calculation to determine the input requirements of the calculation. The query execution engine 126 may then determine whether the input requirements are included in the first previous query result and/or a second previous query.

The query execution engine may determine that the calculation is dependent upon a particular data set from the cloud-based data warehouse. That particular data set may be stored in the cache and included in the first previous query result, the second previous query, or in a combination of the first previous query result and the second previous query result. The calculation or the result of the calculation need not be in the first previous query result or the second previous query result.

Figure 7:
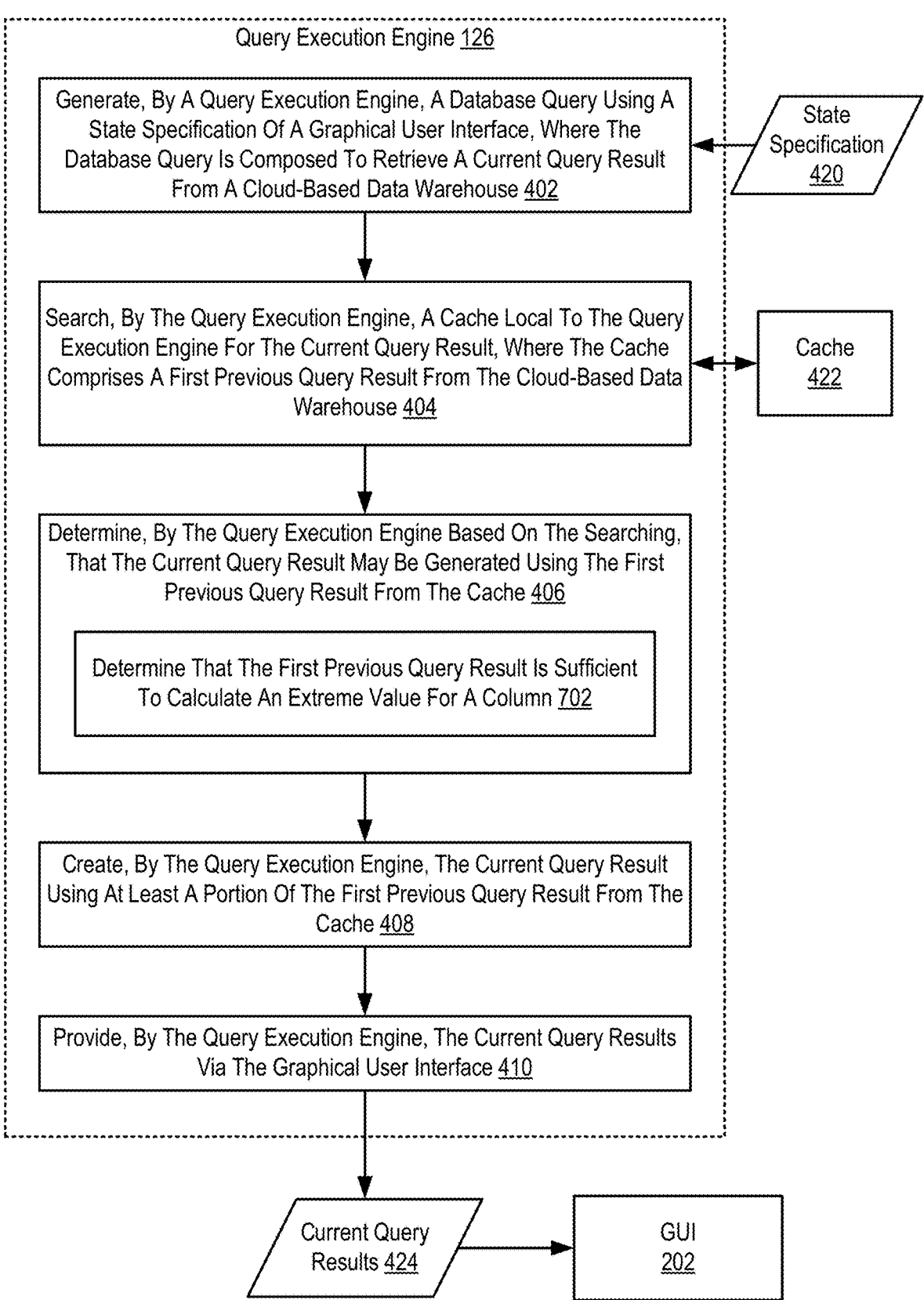
FIG. 7 sets forth a flow chart illustrating an exemplary method for evaluating stored query results according to embodiments of the present invention.

For further explanation, FIG. 7 sets forth a flow chart illustrating a further exemplary method for evaluating stored query results according to embodiments of the present invention that includes generating 402, by a query execution engine 126, a database query using a state specification 420 of a graphical user interface, wherein the database query is composed to retrieve a current query result from a cloud-based data warehouse; searching 404, by the query execution engine 126, a cache 422 local to the query execution engine for the current query result, wherein the cache 422 comprises a first previous query result from the cloud-based data warehouse; determining 406, by the query execution engine 126 based on the searching, that the current query result may be generated using the first previous query result from the cache 422; creating 408, by the query execution engine 126, the current query result using at least a portion of the first previous query result from the cache 422; and providing 410, by the query execution engine 126, the current query result via the graphical user interface 202.

The method of FIG. 7 differs from the method of FIG. 4, however, in that determining 406, by the query execution engine 126 based on the searching, that the current query result may be generated using the first previous query result from the cache 422 includes determining 702 that the first previous query result is sufficient to calculate an extreme value for a column. Determining 702 that the first previous query result is sufficient to calculate an extreme value for a column may be carried out by determining that all data necessary to calculate the extreme value is within the first previous query result. An extreme value may be the minimum or maximum value of a group of rows. The entire group of rows may be necessary to calculate an extreme value for the group of rows. Therefore, the query execution engine 126 may ensure that all necessary rows to calculate the extreme value are available regardless of the database query generated from the state specification.

For example, assume that a GUI only displays rows 40-80 of Table A, but also includes a column calculating the maximum value of rows 1-100. Although a database query may be generated targeting only rows 40-80 (as discussed above), the maximum value of rows 1-100 are not calculatable using only rows 40-80. Accounting for the extreme value calculation, the database query may be modified to request each row 1-100 in order to calculate the maximum value.

Determining 702 that the first previous query result is sufficient to calculate an extreme value for a column may be carried out by determining that the combination of the first previous query result and the second previous query result are sufficient to calculate an extreme value for a column. Determining that the combination of the first previous query result and the second previous query result are sufficient to calculate an extreme value for a column may be carried out by determining that all data necessary to calculate the extreme value is within the first previous query result and the second previous query result.

Figure 8:
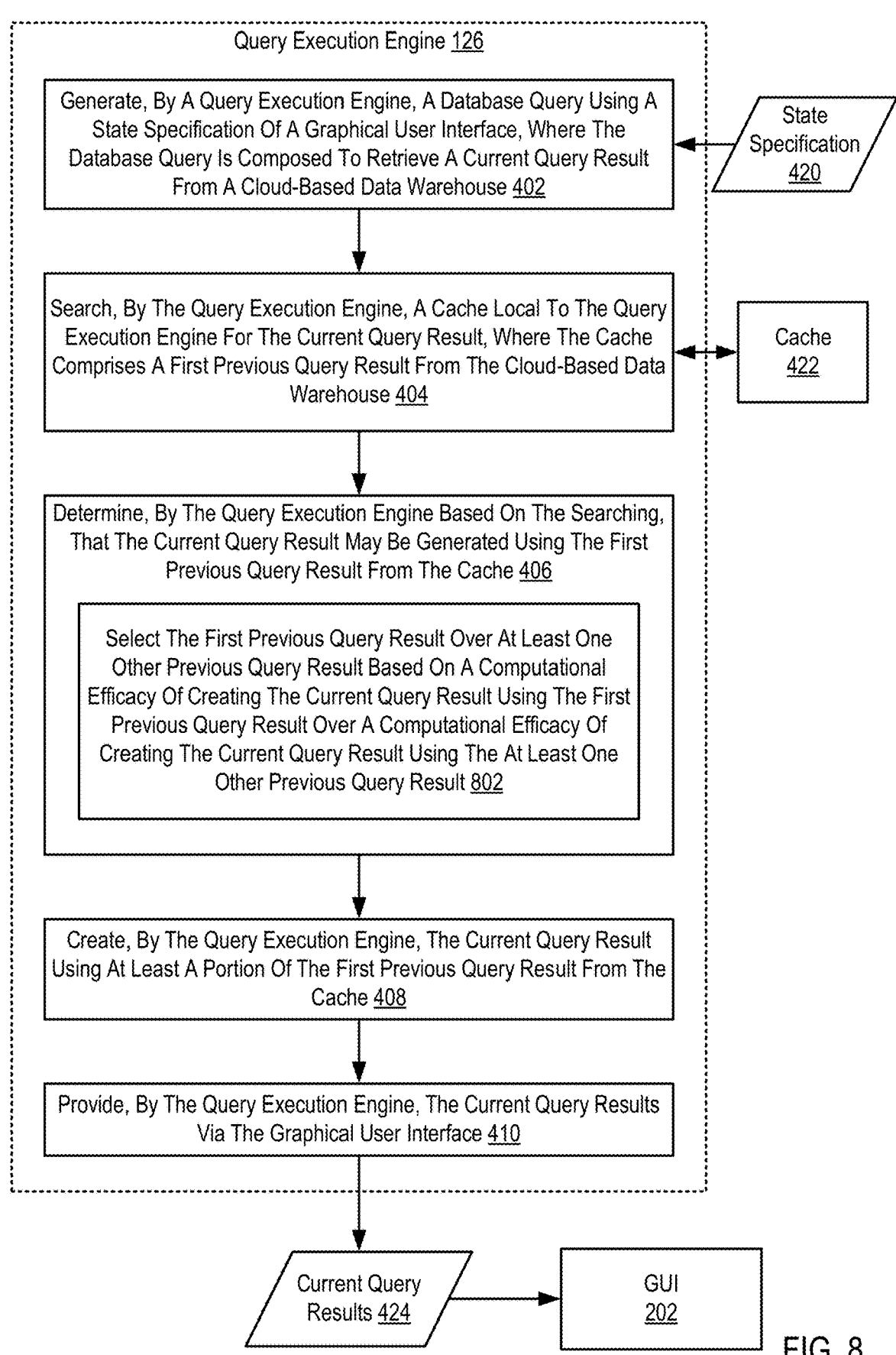
FIG. 8 sets forth a flow chart illustrating an exemplary method for evaluating stored query results according to embodiments of the present invention.

For further explanation, FIG. 8 sets forth a flow chart illustrating a further exemplary method for evaluating stored query results according to embodiments of the present invention that includes generating 402, by a query execution engine 126, a database query using a state specification 420 of a graphical user interface, wherein the database query is composed to retrieve a current query result from a cloud-based data warehouse; searching 404, by the query execution engine 126, a cache 422 local to the query execution engine for the current query result, wherein the cache 422 comprises a first previous query result from the cloud-based data warehouse; determining 406, by the query execution engine 126 based on the searching, that the current query result may be generated using the first previous query result from the cache 422; creating 408, by the query execution engine 126, the current query result using at least a portion of the first previous query result from the cache 422; and providing 410, by the query execution engine 126, the current query result via the graphical user interface 202.

The method of FIG. 8 differs from the method of FIG. 4, however, in that determining 406, by the query execution engine 126 based on the searching, that the current query result may be generated using the first previous query result from the cache 422 includes selecting 802 the first previous query result over at least one other previous query result based on a computational efficacy of creating the current query result using the first previous query result over a computational efficacy of creating the current query result using the at least one other previous query result. Multiple previous query results and combinations of previous query results may be sufficient to generate the current query result. To service the current database query, the query execution engine 126 may select the previous query result based on a comparison of the different computational expenses of extracting the current query result from previous query results.

Computational expense refers to the resources necessary to extract one set of query results from one or more other previous query results. Similarly, computational efficiency is the reduction in resource utilization in selecting one set of previous query results over another set of previous query results for extracting the current query result. Upon comparison, one previous query result may be selected over another previous query result because the computational expense is lower for selecting that previous query result.

For example, the current query result may include rows in a column that calculates the sum of column 1 and column 2 from Table A. A first previous query result may include column 1 and column 2 from Table A. A second previous query result may include column 1 and column 2 from Table A, but additionally includes a calculation column that calculates the sum of column 1 and column 2 from Table A. Although the current query result may be created from the first previous query result, the second previous query result may be selected because no additional calculation would be required to generate the calculation column of the current query result.

Determining 406, by the query execution engine 126 based on the searching, that the current query result may be generated using the first previous query result from the cache 422 may also include selecting 802 the combination of the first previous query result and the second previous query result over at least one other previous query result based on a computational efficacy of creating the current query result using the first previous query result and the second previous query results over a computational efficacy of creating the current query result using the at least one other previous query result. To service the current database query, the query execution engine 126 may select the one or more previous query results based on a comparison of the computational expense of extracting the current query result from the one or more previous query results.

Note that although FIG. 4, FIG. 5, FIG. 6, FIG. 7, and FIG. 8 include utilizing one previous query result to create the current query result, the same methods may be performed utilizing two or more previous query results.

In view of the explanations set forth above, readers will recognize that the benefits of evaluating stored query results according to embodiments of the present invention include:

Improving the operation of a computing system by retrieving result data sets from a local cache rather than remotely from the cloud-based data warehouse, thus reducing time required to service the query and accesses to the could-base data warehouse.

Exemplary embodiments of the present invention are described largely in the context of a fully functional computer system for evaluating stored query results. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for evaluating stored query results, the method comprising:

generating, by a query execution engine distributed between a client computing system and an intermediary computing system, a database query based on a state specification of a graphical user interface, wherein the database query is composed to retrieve a current query result from a cloud-based data warehouse;

searching, by the query execution engine, a cache local to the query execution engine for the current query result, wherein the cache comprises one or more previous query results from the cloud-based data warehouse;

comparing, by the query execution engine during execution of the database query and based on the searching, a computational expense of extracting at least a portion of the current query result from a first query result of the one or more previous query results with a computational expense of extracting the at least the portion of the current query result from at least one other query result of the one or more previous query results;

selecting, by the query execution engine, the first query result in response to the computational expense associated with the first query result being lower than the computational expense associated with the at least one other query result; and creating, by the query execution engine, the current query result to include the portion of the first query result.

2. The method of claim 1, wherein:

the cache further comprises a second query result of the one or more previous query results from the cloud-based data warehouse;

determining, by the query execution engine based on the searching, that the current query result may be generated to include the portion extracted from the first query result comprises determining that the current query result may be generated as a combination of the first query result and the second query result from the cache; and creating, by the query execution engine, the current query result comprises creating the current query result to include the portion of the first query result and at least the portion of the second query result from the cache.

3. The method of claim 1, further comprising providing, by the query execution engine, the current query result via the graphical user interface.

4. The method of claim 1, wherein generating, by the query execution engine, the database query comprises limiting the database query based on the portion of the current query result viewable via the graphical user interface.

5. The method of claim 1, further comprising determining that the current query result is generated to include a portion extracted from the first query result including determining that a value in the current query result may be calculated based on the first query result.

6. The method of claim 1, further comprising determining that the current query result is generated to include a portion extracted from the first query result including determining that the first query result is sufficient to calculate an extreme value for a column.

7. The method of claim 1, wherein the comparing further comprises dynamically estimating, during execution of the database query, resource utilization for each of the one or more previous query results based on current workload conditions of the query execution engine, wherein the computational expense is based on:

an estimated latency of retrieving the portion from each of the one or more previous query results, an amount of data to be transferred between the client computing system and the intermediary computing system, and a number of database operations predicted to be executed by the query execution engine.

8. The method of claim 1, wherein the cache is indexed based on database queries keyed to query results.

9. The method of claim 1, wherein the database query is a structured query language statement.

10. The method of claim 1, wherein the database query is generated by:

converting the state specification to an abstract syntax tree;

converting the abstract syntax tree to relational algebra; and generating the database query from the relational algebra.

11. An apparatus for evaluating stored query results, the apparatus comprising a computer processor and a computer memory operatively coupled to the computer processor, the computer memory comprising computer program instructions that, when executed by the computer processor, cause the apparatus to carry out:

generating a database query based on a state specification of a graphical user interface, wherein the database query is composed to retrieve a current query result from a cloud-based data warehouse;

searching a local cache for the current query result, wherein the cache comprises one or more previous query results from the cloud-based data warehouse;

comparing, during execution of the database query and based on the searching, a computational expense of extracting at least a portion of the current query result from a first query result of the one or more previous query results with a computational expense of extracting the at least the portion of the current query result from at least one other query result of the one or more previous query results;

selecting the first query result in response to the computational expense associated with the first query result being lower than the computational expense associated with the at least one other query result; and creating the current query result to the portion of the first query result.

12. The apparatus of claim 11, wherein:

the cache further comprises a second query result of the one or more previous query results from the cloud-based data warehouse;

determining, based on the searching, that the current query result may be generated to include the portion extracted from the first query result comprises determining that the current query result may be generated as a combination of the first query result and the second previous query result from the cache; and creating the current query result comprises creating the current query result to include the portion of the first query result and at least the portion of the second query result from the cache.

13. The apparatus of claim 11, wherein the computer program instructions further cause the apparatus to carry out providing the current query result via the graphical user interface.

14. The apparatus of claim 11, wherein generating the database query comprises limiting the database query based on the portion of the current query result viewable via the graphical user interface.

15. The apparatus of claim 11, wherein the apparatus is further caused to carry out determining that the current query result is generated to include a portion extracted from the first query result including determining that a value in the current query result may be calculated based on the first previous query result.

16. The apparatus of claim 11, wherein the apparatus is further caused to carry out determining that the current query result is generated to include a portion extracted from the first query result including determining that the first query result is sufficient to calculate an extreme value for a column.

17. The apparatus of claim 11, wherein the comparing further comprises dynamically estimated, during execution of the database query, resource utilization for each of the one or more previous query results based on current workload conditions of a query execution engine, wherein the computational expense is based on:

an estimated latency of retrieving the portion from each of the one or more previous query results, an amount of data to be transferred between a client computing system and an intermediary computing system, and a number of database operations predicted to be executed by the query execution engine.

18. The apparatus of claim 11, wherein the cache is indexed based on database queries keyed to query results.

19. The apparatus of claim 11, wherein the database query is generated by:

converting the state specification to an abstract syntax tree;

converting the abstract syntax tree to relational algebra; and generating the database query from the relational algebra.

20. A computer program product for evaluating stored query results, the computer program product disposed upon a non-transitory computer readable medium, the computer program product comprising computer program instructions that, when executed, cause a computer to carry out:

generating, by a query execution engine distributed between a client computing system and an intermediary computing system, a database query based on a state specification of a graphical user interface, wherein the database query is composed to retrieve a current query result from a cloud-based data warehouse;

searching, by the query execution engine, a local cache for the current query result, wherein the cache comprises one or more previous query results from the cloud-based data warehouse;

comparing, during execution of the database query and based on the searching, a computational expense of extracting at least a portion of the current query result from a first previous query result of the one or more previous query results with a computational expense of extracting the at least the portion of the current query result from at least one other query result of the one or more previous query results;

selecting, by the query execution engine, the first query result in response to the computational expense associated with the first query result being lower than the computational expense associated with the at least one other query result; and creating the current query result to the portion of the first query result.

* * * * *